(12) United States Patent
Hasch

(10) Patent No.: US 9,575,158 B2
(45) Date of Patent: Feb. 21, 2017

(54) CIRCUIT FOR MILLIMETER WAVE SIGNALS

(71) Applicant: Robert Bosch GmbH, Stuttgart (DE)

(72) Inventor: Juergen Hasch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 296 days.

(21) Appl. No.: 14/469,789

(22) Filed: Aug. 27, 2014

(65) Prior Publication Data

US 2015/0061925 A1    Mar. 5, 2015

(30) Foreign Application Priority Data

Aug. 27, 2013  (DE) .................. 10 2013 216 993

(51) Int. Cl.
*G01S 7/02*     (2006.01)
*G01S 13/93*    (2006.01)

(52) U.S. Cl.
CPC ............. *G01S 7/02* (2013.01); *G01S 13/931* (2013.01); *G01S 2007/028* (2013.01)

(58) Field of Classification Search
CPC ..... G01S 13/931; G01S 2007/028; G01S 7/02
USPC .......................................... 342/175
See application file for complete search history.

(56) References Cited

U.S. PATENT DOCUMENTS

2010/0308942 A1* 12/2010 Shmuel .................. H01P 5/107
                                                333/254

\* cited by examiner

*Primary Examiner* — Timothy A Brainard
(74) *Attorney, Agent, or Firm* — Norton Rose Fulbright US LLP; Gerard Messina

(57) ABSTRACT

A circuit for millimeter wave signals, having a housing, mounted on a circuit board, that accommodates a high-frequency component, wherein the housing forms, on at least one housing wall facing away from the circuit board, a coupling structure for millimeter wave signals to which a hollow conductor is coupled outside the housing.

8 Claims, 2 Drawing Sheets

CIRCUIT FOR MILLIMETER WAVE SIGNALS

FIELD OF THE INVENTION

The present invention relates to a circuit for millimeter wave signals having a housing, mounted on a circuit board, that accommodates a high-frequency component.

BACKGROUND INFORMATION

Such circuits are used for example in radar sensors for motor vehicles in order to produce and/or process the radar signals. The high-frequency component is typically an integrated semiconductor component (MMIC, or Monolithic Microwave Integrated Circuit) that is encapsulated in a housing suitable for surface-mounting technique, for example an eWLB (embedded Wafer Level Ball Grid) housing. The fastening and electrical contacting of the high-frequency component on the circuit board takes place for example using spherical solder contacts. Via these contacts, both low-frequency signals used for power supply and to control the component and also the actual high-frequency signals are transmitted.

The object of the present invention is to create a circuit for millimeter wave signals that can be produced more easily.

According to the present invention, this object is achieved in that the housing forms, on at least one housing wall facing away from the circuit board, a coupling structure for the millimeter wave signals, to which a hollow conductor is coupled outside the housing.

According to the present invention, in this way the millimeter wave signals are coupled in and/or out immediately through the wall of the housing, bypassing the galvanic contacts on the side facing the circuit board.

This solution has the advantage that a high-frequency-capable substrate is no longer required for the circuit board, thus saving costs. Because the galvanic contacts are then used only to transmit low-frequency signals, they also no longer need be high-frequency-capable, so that larger production tolerances can be permitted, thus achieving further savings.

The term "hollow conductor" is also used here for hollow conductor structures whose hollow space contains a dielectric.

The housing wall on which the coupling structure is formed can be a side wall of the housing that is oriented at a right angle to the circuit board, or preferably can be the housing wall parallel to the circuit board on the side opposite the circuit board.

The coupling structure in the housing is preferably formed by a wave conductor that can be filled with a dielectric and that is realized in such a way that it conducts the millimeter waves to the housing wall and couples them out through this wall, so that further conducting can then take place via the hollow conductor situated outside the housing. Preferably, for this purpose the hollow conductor has, at its end adjacent to the housing, an adapting structure that provides a strong and largely impact-free coupling between the housing and a hollow conductor.

In an advantageous specific embodiment, the hollow conductor is formed in a hood that covers the housing and that can be mounted on the circuit board independently of the housing. This hood can at the same time form a wave trap that enables a reduction of the insertion loss. A plurality of coupling points for a plurality of hollow conductors can be formed on one and the same housing. In this case, at the same time the mentioned wave traps improve the insulation of the plurality of coupling points from one another.

DETAILED DESCRIPTION

Figure 1:
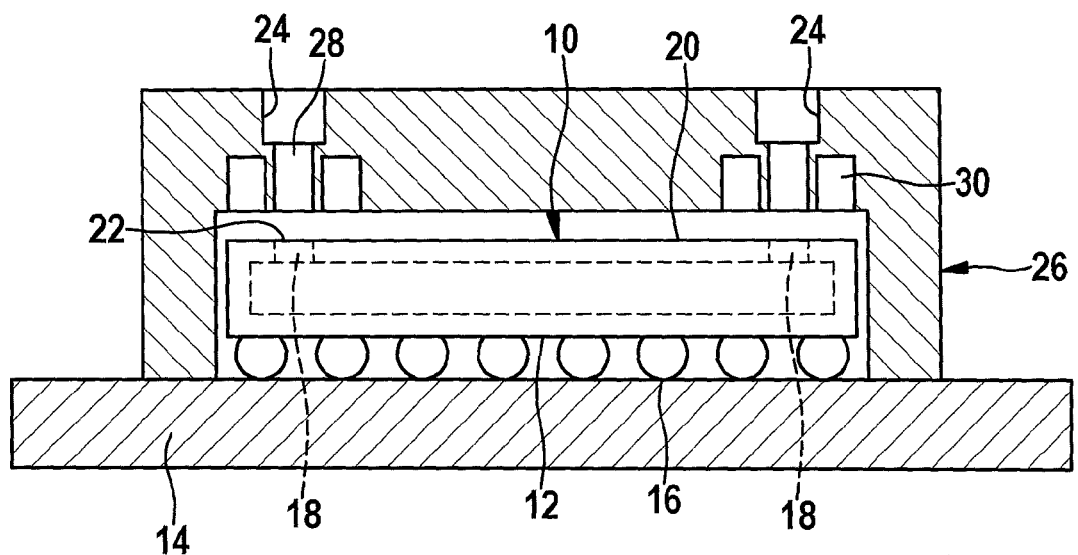
FIG. 1 shows a schematic section through a circuit according to the present invention for millimeter wave signals, having a circuit board, a high-frequency component, and a hood covering these.

The circuit for millimeter wave signals shown in FIG. 1 has a high-frequency component 10, for example an integrated semiconductor component, that is encapsulated by itself or together with other high-frequency components in a housing 12, for example an eWLB housing. Housing 12 is fastened and contacted on the surface of a circuit board 14 using SMD (Surface Mounted Device) technology, and for this purpose has a grid-shaped configuration of spherical solder contacts 16 in a housing wall that faces circuit board 14. However, these contacts are used only to transmit supply voltages and, if warranted, low-frequency control signals, and therefore do not need to be high-frequency-capable. A low-cost substrate, which need not be high-frequency-capable, can also be used for circuit board 14.

For the coupling in or out of the millimeter wave signals, housing 12 has on its inside coupling points 18 that are fashioned as wave conductors with or without dielectric filling, and that couple millimeter wave signals in or out through a housing wall facing away from circuit board 14, in this case the housing wall on the side opposite the circuit board. In the depicted example, this housing wall has a metallization 20 that is interrupted by windows 22 at the locations where coupling points 18 are situated. In this way, the millimeter wave signals can be coupled in or out through windows 22 through hollow conductors 24 that extend outside housing 12 at a right angle to the metallized housing wall.

In the depicted example, hollow conductors 24 are formed in a hood 26 that is made of a material having good conductivity or that at least has a conductive surface, e.g. a surface coated with conductive plastic, and that forms a covering for housing 12. Hood 26 is fastened immediately on circuit board 14, for example by gluing, and is made so that it completely encloses housing 12 at all sides with the exception of the side facing circuit board 14. However, here the hood has a certain distance from housing 12, so that possible measurement tolerances occurring during production and/or assembly of the hood do not have any significant disadvantageous effects on the quality of the electromagnetic coupling.

In the depicted example, at the ends of hollow conductors 24 adapting structures 28 are formed that are formed by suitably shaped hollow spaces in the wall of hood 26 and that minimize the transmission losses at the transition from coupling point 18 to hollow conductor 14. Hollow conductors 14 are each connected axially to the associated adapting structure 28, and can have a rectangular cross-section having dimensions of 2.54×1.27 mm (WR-10 standard). Optionally, the hollow conductors can also contain a dielectric.

Hollow conductors 24 shown in FIG. 1 can go over, outside hood 26, into connected hollow conductors (not shown) through which the millimeter wave signals can be distributed for example to antennas of a radar sensor.

In the depicted example, each adapting structure 28 is surrounded by a wave trap 30 in the form of a rectangular trench. These wave traps 30 prevent electromagnetic scatter fields, which can occur in connection with the transmission of the millimeter waves between coupling points 18 and hollow conductors 24, from propagating in the intermediate space between housing 12 and hood 26, so that they are accommodated by adapting structure 28. In this way, the insertion loss is reduced, and in the example described here, in which housing 12 has two coupling points for two hollow conductors 24, at the same time the insulation between the two coupling points is improved, so that the signals are coupled in and out independently of one another via the various coupling points.

Figure 2:
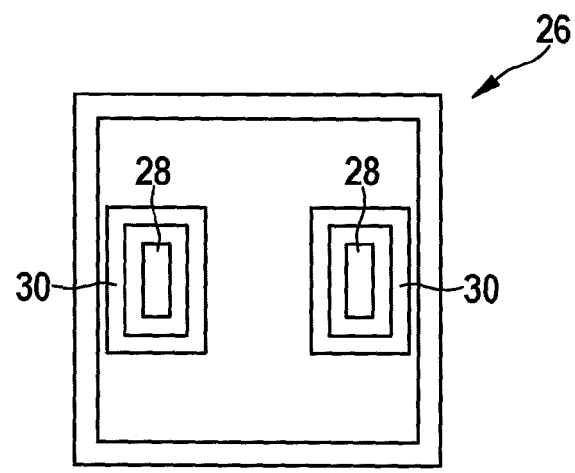
FIG. 2 shows an interior view of the hood.

FIG. 2 shows hood 26 in a view from below in FIG. 1, and the course of the trenches forming wave traps 30 around adapting structures 28 can be seen.

Figure 3:
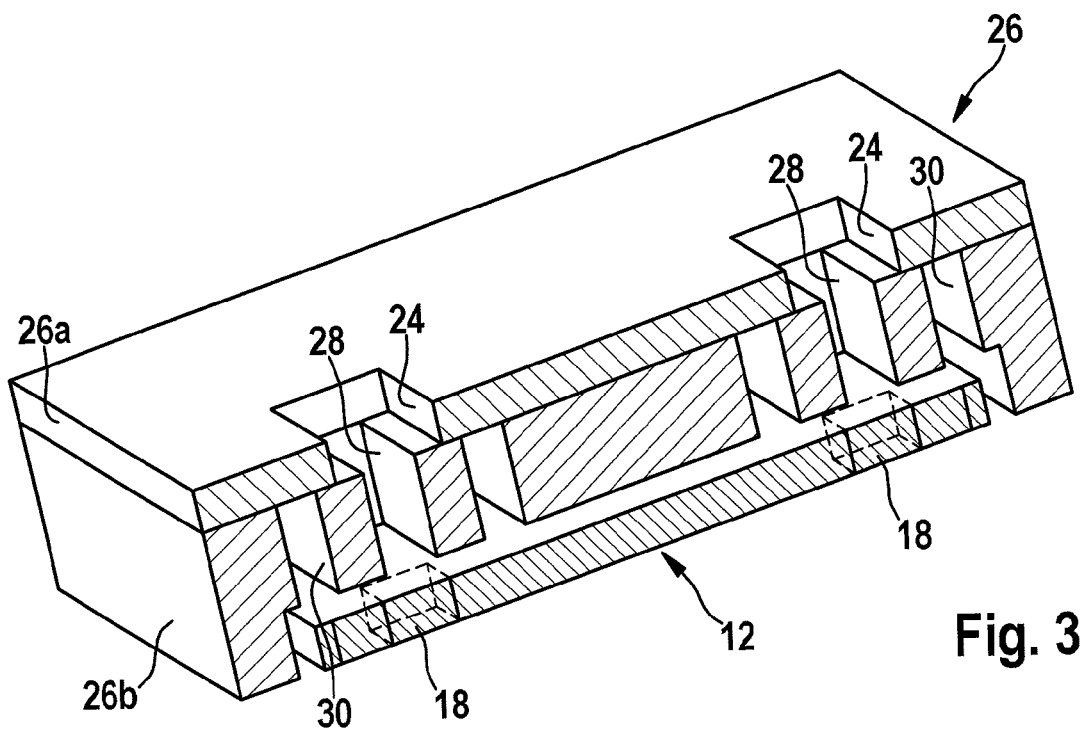
FIG. 3 shows a perspective sectional view of the high-frequency component and of the housing.

FIG. 3 provides a spatial depiction of the system. In the example shown there, hood 26 is formed by two plates 26a, 26b, made for example of aluminum, situated one over the other and connected to one another in conductive fashion, of which one forms hollow conductors 24 and the other forms adapting structures 28 and wave traps 30.

Figure 4:
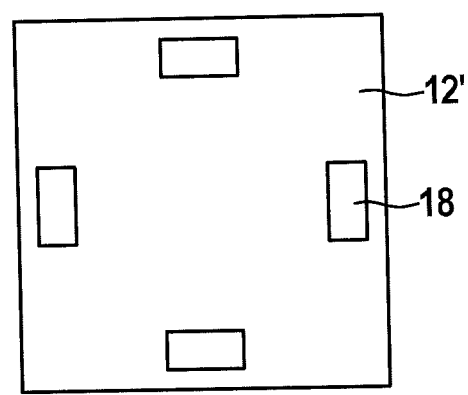
FIG. 4 shows a plan view of a circuit according to a different exemplary embodiment.

The number of coupling points 18 of housing 12, and, correspondingly, the number of wave conductors 24, can vary as needed. As an example, FIG. 4 shows a plan view of a circuit having a housing 12', which has a square basic shape, and having four coupling points 18, each situated centrically relative to the four sides of the square.

What is claimed is:

1. A circuit for a millimeter wave signal, comprising:
   a circuit board;
   a high-frequency component;
   a hollow conductor; and
   a housing, mounted on the circuit board, that accommodates the high-frequency component, wherein the housing forms, on at least one housing wall facing away from the circuit board, a coupling structure for the millimeter wave signal to which the hollow conductor is coupled outside the housing.

2. The circuit as recited in claim 1, wherein the housing is an eWLB housing.

3. The circuit as recited in claim 1, wherein the coupling structure and the hollow conductor are situated on a housing wall that extends parallel to the circuit board on a side of the housing opposite the circuit board.

4. The circuit as recited in claim 3, wherein the housing wall has a metallization that is interrupted by windows at locations where coupling points are situated.

5. The circuit as recited in claim 1, further comprising a plurality of coupling points and a plurality of hollow conductors insulated electromagnetically from one another on the same housing.

6. The circuit as recited in claim 1, further comprising an adapting structure via which an end of the hollow conductor is coupled to the coupling point.

7. The circuit as recited in claim 6, further comprising a wave trap that surrounds the adapting structure.

8. The circuit as recited in claim 1, further comprising a hood, wherein the end of the hollow conductor adjoining the coupling point is formed in the hood, the hood together with the circuit board enclosing the housing.

* * * * *